June 5, 1956

J. L. CASSELL ET AL 2,749,453

ELECTRIC BELL MOTOR

Filed April 30, 1952

INVENTORS
JOSEPH L. CASSELL
HOWARD L. CARETTO

BY Philip S. McLean
ATTORNEY

June 5, 1956     J. L. CASSELL ET AL     2,749,453
ELECTRIC BELL MOTOR
Filed April 30, 1952     3 Sheets-Sheet 2
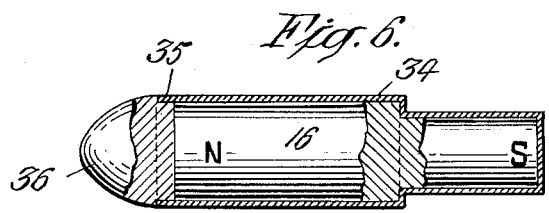
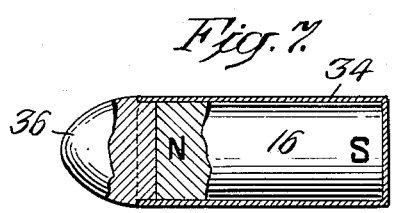
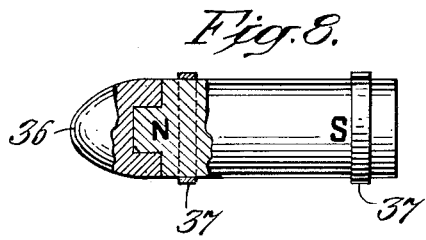
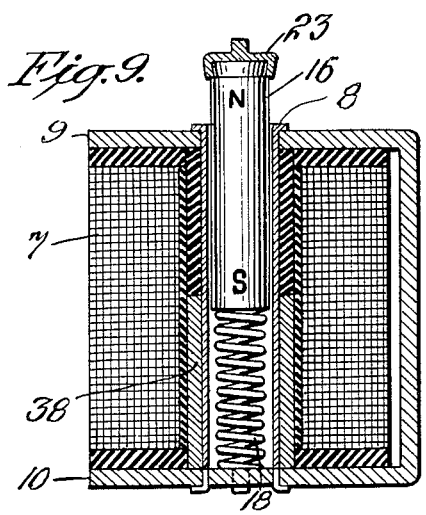
INVENTORS
JOSEPH L. CASSELL
BY HOWARD L. CARETTO
ATTORNEY June 5, 1956  J. L. CASSELL ET AL  2,749,453
ELECTRIC BELL MOTOR Filed April 30, 1952  3 Sheets-Sheet 3

INVENTORS
JOSEPH L. CASSELL
HOWARD L. CARETTO
BY
Philip S. Dean.
ATTORNEY

United States Patent Office 2,749,453
Patented June 5, 1956

2,749,453
ELECTRIC BELL MOTOR

Joseph L. Cassell, New York, and Howard L. Caretto, Brooklyn, N. Y., assignors to The Reeve Electrical Co., Inc., New York, N. Y., a corporation of New York Application April 30, 1952, Serial No. 285,116

1 Claim. (Cl. 310—30)

The invention herein disclosed relates to electric bells of the alternating current type and the general objects of the invention are to provide a small, compact, powerful reciprocating motor unit for bells or devices of this character which will consist of but few parts and which can be produced at relatively low cost.

Special objects of the invention are to provide a reciprocating motor unit for bells or other devices which will not require any make and break contacts, rectifiers or other appurtenances.

A special feature of the invention is the utilization of a permanent magnet as a striker, and in this connection it is a purpose of the invention to protect this permanent magnet striker against loss of its magnetism and to insure its necessary freedom of action and ability to operate in different positions, such as horizontal, vertical or inclined.

Other desirable objects and the novel features through which the purposes of the invention are attained are set forth or will appear in the course of the following specification.

The drawings accompanying and forming part of the specification illustrate a number of present preferred embodiments of the invention but structure may be further modified and changed as regards such illustration, all within the true intent and scope of the invention as hereinafter defined and claimed.

Fig. 1 in the drawings is a broken sectional view of the invention as embodied in a bell or gong construction;

Figs. 6, 7 and 8 are broken sectional details of different forms of reciprocating striker magnets constructed to insure free sliding action;

Figs. 9, 10, 11, 12 and 13 are broken sectional views illustrating other forms of the invention.

Figure 1:
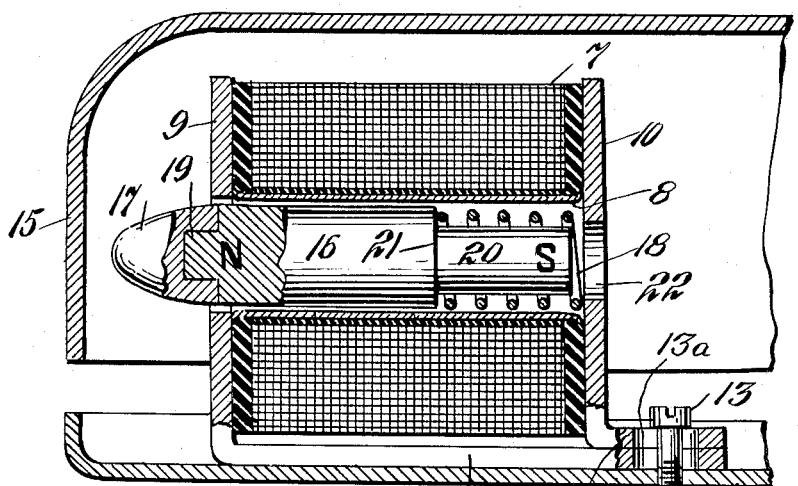

In the several views an alternating current solenoid is illustrated at 7 having a central guide sleeve 8 of brass or other nonmagnetic material and supported between end heads 9 and 10 of magnetic material, these heads forming angular extensions of the brackets or base plates 11, 12, secured in overlying relation by a through screw or screws 13.

These coil supporting brackets may be adjustably mounted and secured by the screw 13 passing through a slot 13a in the brackets into the supporting base 14, which in the case illustrated may be the back or supporting structure of a bell or gong.

The bell or gong top indicated at 15 is usually supported on the base 14 in position enclosing the solenoid and to be struck by the hammer actuated by the solenoid.

In this invention the hammer element is a permanent magnet constituting the movable core of the solenoid.

Figure 2:
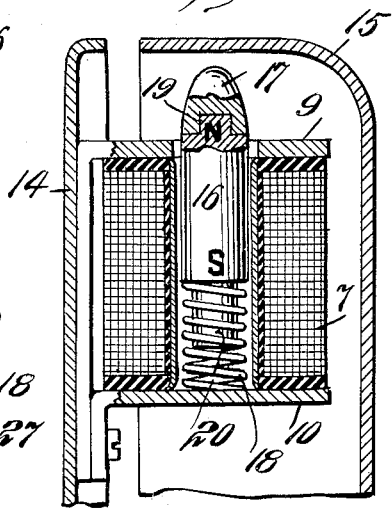
Fig. 2 is a generally similar view showing the reciprocating element of the motor unit operating vertically instead of horizontally as in Fig. 1, and with the inner end of the solenoid closed instead of open for movement of the reciprocating element as in Fig. 1.

As shown in Figs. 1 and 2, the movable core, hammer and permanent magnet are all combined in one element, in the form of a substantially cylindrical permanent magnet 16, having a hammer or striker head 17 at one end and yieldingly supported with this hammer head projecting from the end of the solenoid by a spring 18 at the opposite end of the magnet.

The hammer head may be of bronze or other suitable nonmagnetic metal attached to the permanent magnet as by being cast or otherwise interlockingly secured thereto.

In the first instance, Figs. 1 and 2, the permanent magnet is shown as having a reduced and shouldered end portion 19 over which the non-ferrous hammer head is secured as by being cast thereover.

The supporting spring 18 may be engaged with the opposite end of the permanent magnet in various ways.

In Figs. 1 and 2, the inner end of the magnet is shown reduced and shouldered at 20 and 21 and the spring as engaged about this reduced end portion 20 and bearing against annular shoulder 21. The end bracket 10 provides a support for the outer end of the spring and this bracket in Fig. 1 is shown as having an opening 22 in line with the reduced portion of the permanent magnet and large enough to permit passage of the same so as not to limit inward movement of the magnet in the solenoid.

In Fig. 2 the supporting bracket 10 is shown as closed, or as having no opening for passage of the inner end of the permanent magnet. In this case the magnet is of such length that it will not touch the bracket under maximum compression of the spring. The spring 18 may close sufficiently to act as a stop positively preventing engagement of the inner end of the magnet with the supporting bracket. In any event, the inner end of the permanent magnet is prevented from contacting the supporting bracket 10, which would ordinarily be of ferrous material.

Fig. 2 also shows how the motor may be mounted with the permanent magnet hammer core operating vertically instead of horizontally, as in Fig. 1.

Figure 3:
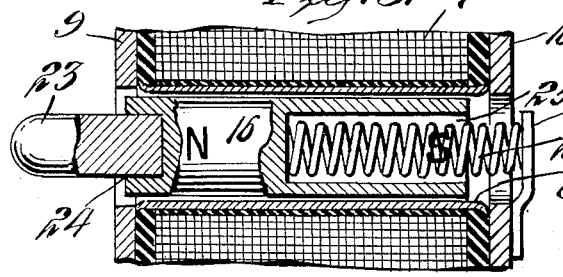
Fig. 3 is a broken sectional detail illustrating a modification in which the rebound spring is contained within an opening in the inner end of the reciprocating element instead of surrounding this element, as in Fig. 1.

Fig. 3 illustrates possible variations in structure, involving fastening of the hammer head 23 by securing it in a recessed seat or opening 24 in the outer end of the permanent magnet and providing the inner end of the magnet with a longitudinal bore 25 to receive the supporting spring 26.

In this case the supporting bracket has an opening 22 for the end of the magnet and the spring is supported by an offset bracket or lug 33 extending over this opening.

Figure 4:
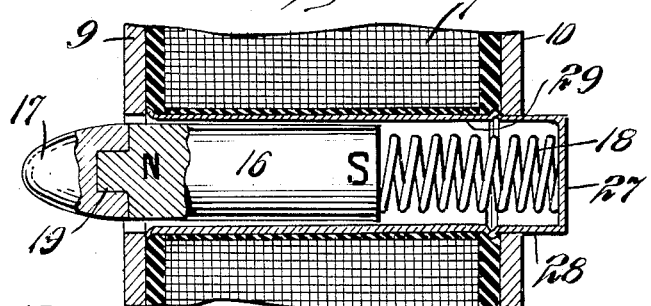
Fig. 4 is a broken sectional detail of a modification in which the rebound spring is offset at the inner end of the reciprocating element.

In the modification shown in Fig. 4, the spring 18 bears directly against the inner end of the permanent magnet and is supported at the outer end by the closed end wall 27 of a tubular extension 28 of the guide tube 29.

Each construction has advantages suiting it to particular needs or requirements.

In all forms the permanent magnet is supported by the spring in magnetically unbalanced relation providing the necessary air gap for reciprocating operation of the permanent magnet in the solenoid under influence of alternating current.

The provision of the permanent magnet with a hammer head of bronze, brass or other non-ferrous material prevents direct engagement of the permanent magnet with magnetic material and hence avoids loss of magnetism from the permanent magnet to other magnetic material, which might be the gong top or other element struck by the magnet. The same care is taken to prevent the inner end of the permanent magnet from directly engaging a magnetic structure, such as the supporting bracket. This, as pointed out above, may be accomplished in different ways, as by permitting the inner end of the magnet to operate freely through an opening in the supporting bracket, as in Fig. 1, or the spring may be stiff enough or may close up to such an extent as to prevent the inner end of the magnet from striking magnetic supporting or other structure.

If desired, the spring may be used to grip and hold the reciprocating magnet in the bore of the solenoid, or a separate retainer spring may be utilized to hold the magnet against escape from the solenoid. If the latter is employed, the two springs may be confined by flanges or the like in opposite ends of the guide tube with the reciprocating permanent magnet balanced therebetween. Additionally, this guide tube containing the two springs and the reciprocating magnet may be adjustably mounted in the solenoid, as by screwing it through a support at one end of the coil so that it may be shifted longitudinally in the coil to best perform its reciprocating functions.

Figure 5:
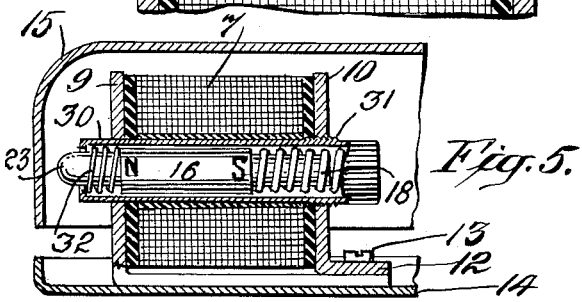
Fig. 5 is a broken sectional detail illustrating another modification.

Fig. 5 illustrates the latter form of construction.

In this view the permanent magnet and spring assembly is all contained within a nonmagnetic guide sleeve 30 which is screwed at 31 in bracket 10 or other supporting structure so that it may be longitudinally adjusted within the solenoid with respect to the bell or gong top 15.

This view also shows the permanent magnet 16 as yieldingly retained within the guide tube by a retainer spring 32 confined in the outer end of the tube and bearing against the outer end of the magnet, in opposition to force exerted by supporting spring 18 at the opposite end of the magnet.

The permanent magnet may be made longer or shorter, as apparent by comparison of Figs. 1 and 4, depending on power or striking force and other requirements. These magnets may be readily produced in the simple rod-like forms illustrated. The elimination of separate hammer and core elements and the combination of these in a single unitary element enables the complete motor unit to be made in small compact form, particularly adapting it for mounting under a bell or gong top.

While primarily intended for bell and gong operation, it will be appreciated that the reciprocating motor unit disclosed may be used for other purposes.

The permanent magnets of high intensity used in this invention are made of an extremely hard alloy having a rough surface which cannot easily be polished. This roughness may be such as to act with an abrasive effect, impeding movement of the magnet and wearing the surface of the guide cylinder in which the magnet operates.

Accordingly, a further feature of the invention is to encase the permanent magnet in a thin wall, non-ferrous sheath or shell permanently attached to and travelling with the magnet and forming, in effect, an integral part of the same.

This sheath may be a non-ferrous metal such as brass or bronze and has a smooth, non-abrasive surface assuring free, easy sliding movement of the magnet.

Fig. 6 shows a magnet core 16 of the shouldered type illustrated in Fig. 1, encased in a thin, non-ferrous, permanently attached jacket or sheath 34. This may extend continuously about the permanent magnet and overlap the shouldered end portion 35 of the hammer head 36 sufficiently to serve as the means for attaching the head to the magnet.

Fig. 7 shows a permanent magnet of the short form illustrated in Fig. 4, entirely encased in a non-ferrous metal sheath 34 with the latter serving also as the means for securing the non-ferrous hammer head to the end of the magnet.

Fig. 8 illustrates a variation in which easy sliding movement of the rough surfaced permanent magnet is assured by two or more rings 37 rolled into place or otherwise secured about opposite end portions of the magnet.

If desired, the magnet may be grooved to receive these slide rings, but the rough surface of the magnet may serve to provide sufficient interlock between the magnet and the encircling rings.

These friction reducing elements, whether in the form of casings or surrounding rings, may be applied by electrochemical plating as well as by casting or rolling, or other mechanical methods, and the applied covering material may be polished or otherwise treated to assure complete freedom of magnet action.

The bronze or other non-ferrous hammer head prevents the permanent magnet from striking ferrous metal and thereby losing part of its magnetism at each stroke. The softer material of the bronze tip also is a protection against fracture of the brittle alloy constituting the permanent magnet. The thin friction reducing protection applied to the permanent magnet is a factor in enabling the bell motor to be used in horizontal, vertical or variously inclined positions and is an important aid to the proper free action of the motor, particularly because of the necessarily heavy weight of the permanent magnet alloys used.

It will be appreciated that the permanent magnets shown in Figs. 6, 7 and 8 may be used with any of the solenoid constructions shown in Figs. 1 to 5, or in fact with other forms of solenoids.

Fig. 9 illustrates a form of the invention generally similar to those shown in Figs. 1 and 4, in which the action of the reciprocable permanent magnet is governed and controlled to an extent by a sleeve 38 of magnetic material extending from one pole piece 10 into one end of the solenoid.

Figs. 10, 11, 12 and 13 show how generally the same effects may be obtained by providing a plug of magnetic material in the end of the solenoid winding.

Figure 10:
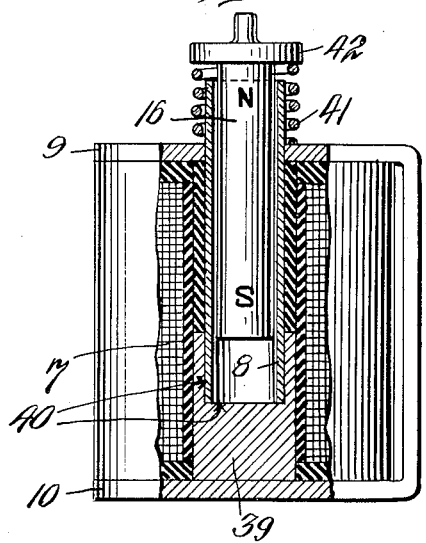

In Fig. 10 a plug 39 of iron or steel is engaged in one end of the solenoid coil, and the inner end of this plug is hollowed, as indicated at 40, to provide a seat for the inner end of the guide tube 8, which is extended beyond the opposite end of the solneoid to form a guide for the spring 41 which is interposed between the pole piece 9 at that end and the flanged striker or tapper head 42 on the end of the permanent magnet.

Figure 11:
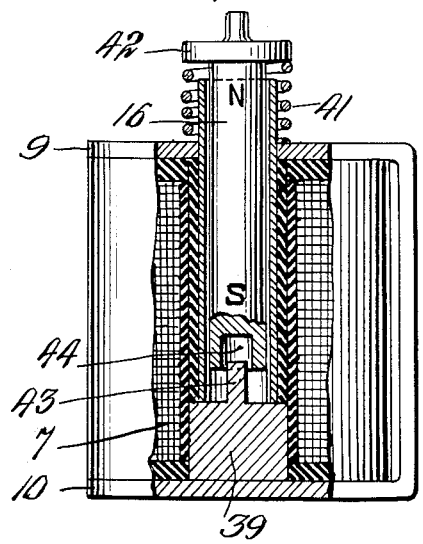

Fig. 11 shows how the magnetic plug in the end of the solenoid may be made with a center projection 43 to enter an opening 44 in the inner end of the permanent magnet.

Figure 12:
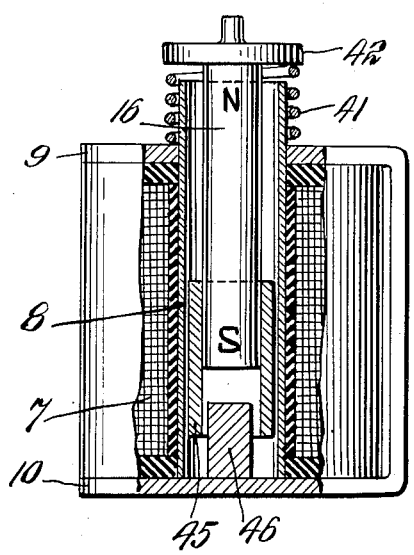

In Fig. 12 the overlapping effect is attained by a sleeve, collar or ring 45 of magnetic material fixed over the inner end of the permanent magnet and overlapping the center plug projection 46.

Figure 13:
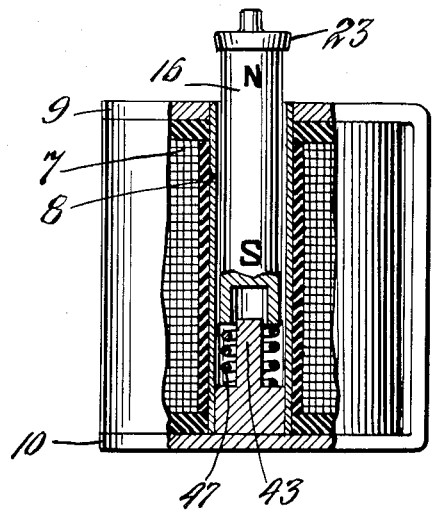

Fig. 13 illustrates a variation of the Fig. 11 form, in which the spring 47 is disposed about the center projection 43 of the magnetic plug, in engagement with the inner end of the permanent magnet.

What is claimed is:

An alternating current reciprocating motor unit comprising an alternating current solenoid and a permanent magnet freely reciprocable therein and having an applied, smooth, friction reducing protection thereon and reciprocating therewith, a hammer head of non-ferrous material on one end of said permanent magnet and said applied protection extending over and securing said hammer head to said permanent magnet.

References Cited in the file of this patent

UNITED STATES PATENTS

| | | |
|---|---|---|
| 20,930 | Barnes | July 20, 1858 |
| 341,981 | Woolson | May 18, 1886 |
| 608,175 | Casler | Aug. 2, 1898 |
| 937,594 | Graham | Oct. 19, 1909 |
| 946,267 | Paulero | Jan. 11, 1910 |
| 1,098,893 | Dinsmoor | June 2, 1914 |
| 2,033,015 | Thompson | Mar. 3, 1936 |
| 2,223,144 | Wheelock | Nov. 26, 1940 |
| 2,357,743 | Kenerson | Sept. 5, 1944 |
| 2,383,411 | Obszarny | Aug. 21, 1945 |
| 2,561,355 | Fish | July 24, 1951 |

FOREIGN PATENTS

| | | |
|---|---|---|
| 124,095 | Australia | Oct. 2, 1947 |
| 629,510 | Great Britain | Sept. 21, 1949 |
| 770,497 | France | July 12, 1934 |